(12) United States Patent
Wu et al.

(10) Patent No.: US 11,001,009 B2
(45) Date of Patent: May 11, 2021

(54) PRESSURE MAINTAINING AND ALIGNMENT DEVICE

(71) Applicant: SUZHOU RS TECHNOLOGY CO., LTD., Suzhou (CN)

(72) Inventors: Jiafu Wu, Suzhou (CN); Lei Miao, Suzhou (CN)

(73) Assignee: SUZHOU RS TECHNOLOGY CO., LTD., Suzhou (CN)

( * ) Notice: Subject to any disclaimer, the term of this patent is extended or adjusted under 35 U.S.C. 154(b) by 77 days.

(21) Appl. No.: 16/486,823

(22) PCT Filed: Nov. 9, 2017

(86) PCT No.: PCT/CN2017/110213
§ 371 (c)(1),
(2) Date: Aug. 16, 2019

(87) PCT Pub. No.: WO2018/227863
PCT Pub. Date: Dec. 20, 2018

(65) Prior Publication Data
US 2020/0230891 A1    Jul. 23, 2020

(30) Foreign Application Priority Data

Jun. 16, 2017   (CN) .......................... 201710461579.5

(51) Int. Cl.
*B29C 65/48*        (2006.01)
*B29C 65/00*        (2006.01)
(Continued)

(52) U.S. Cl.
CPC .......... *B29C 65/48* (2013.01); *B29C 66/1122* (2013.01); *B29C 65/7802* (2013.01);
(Continued)

(58) Field of Classification Search
CPC ....... B29C 65/00; B29C 65/48; B29C 65/483; B29C 65/78; B29C 65/7802;
(Continued)

(56) References Cited

U.S. PATENT DOCUMENTS

| 7,562,418 B2 * | 7/2009 | Huang ................ H04M 1/0216 16/221 |
| 8,112,878 B1 * | 2/2012 | Ding .................... H05K 5/0004 29/760 |
| 2015/0107767 A1 * | 4/2015 | Wadsworth ........... B29C 66/861 156/324 |

\* cited by examiner

*Primary Examiner* — Philip C Tucker
*Assistant Examiner* — Brian R Slawski
(74) *Attorney, Agent, or Firm* — Platinum Intellectual Property LLP

(57) ABSTRACT

There is provided a pressure maintaining and alignment device, comprising a box body that is open at its front side to form an outer opening having a certain depth; a cover assembly for opening and closing outer opening; a pushing assembly disposed on a rear side of box body for selectively clamping a product to be pressure-maintained; and a pressing assembly located at a rear side of the pushing assembly; wherein pressing assembly comprises a pushing rod and a pressing plate, at least one pressing arm extending to above the box body is provided at top of pressing plate, an alignment adjusting assembly is provided between pressing arm and box body, and pressing plate selectively pushes alignment adjusting assembly by the pressing arm under driving of pushing rod, so that the product to be pressure-maintained in the box body is selectively pressed, pressure-maintained and aligned.

10 Claims, 4 Drawing Sheets

(51) Int. Cl.
  *B29C 65/78* (2006.01)
  *B32B 37/10* (2006.01)
  *B32B 37/00* (2006.01)
  *B32B 38/18* (2006.01)

(52) U.S. Cl.
  CPC .......... *B29C 65/7841* (2013.01); *B29C 66/71* (2013.01); *B29C 66/81* (2013.01); *B29C 66/82261* (2013.01); *B29C 66/832* (2013.01); *B29C 66/8322* (2013.01); *B29C 66/841* (2013.01); *B32B 37/0046* (2013.01); *B32B 37/1045* (2013.01); *B32B 38/1833* (2013.01); *B32B 2457/00* (2013.01)

(58) Field of Classification Search
  CPC . B29C 65/7841; B29C 65/7855; B29C 66/00; B29C 66/80; B29C 66/81; B29C 66/8145; B29C 66/81463; B29C 66/81451; B29C 66/816; B29C 66/8161; B29C 66/82; B29C 66/822; B29C 66/8226; B29C 66/82261; B29C 66/826; B29C 66/8262; B29C 66/83; B29C 66/832; B29C 66/84; B29C 66/841; B29C 66/1122; B29C 66/71; B29C 66/8322; B32B 37/00; B32B 37/10; B32B 37/1045; B32B 37/0046; B32B 38/00; B32B 38/18; B32B 38/1825; B32B 38/1833; B32B 2457/00; B32B 2457/02; B25B 5/00; B30B 1/00; B30B 1/02; B30B 1/04; F16B 2/10; F16B 11/006
  USPC ..... 156/60, 64, 69, 108, 293, 312, 349, 350, 156/360, 379, 381, 538, 539, 556, 580; 81/487; 29/428, 464, 465, 466, 468, 592, 29/700, 729, 760
  See application file for complete search history.

PRESSURE MAINTAINING AND ALIGNMENT DEVICE

TECHNICAL FIELD

The present invention relates to the field of non-standard automation, and more particularly to a pressure maintaining and alignment device.

BACKGROUND

In the assembly process of electronic products such as mobile phones, for an assemble between an outer casing and some modules therein, it is necessary to press the outer casing and the module and hold for a certain time after adding a curing material such as glue to a position to be assembled of the module, to ensure that the module can be firmly combined with the outer casing. And it is also necessary to ensure accurate alignment of the outer casing and the module in the curing and bonding process, to ensure quality pass rate of the assembled product.

Most of the existing assembly techniques are manual assembly or semi-automated assembly, which has many manual intervention steps. There is a problem of high faulty rate due to large manual alignment error and uneven press force. In view of this, it is necessary to develop a pressure maintaining and alignment device, to solve the above problems.

SUMMARY

In view of the deficiencies in the prior art, it is an object of the present invention to provide a pressure maintaining and alignment device, which can improve pressure maintaining and alignment efficiency while improving the alignment accuracy, thereby improving assembly yield rate and reducing production cost of an enterprise.

To achieve the above mentioned object and other advantages of the present invention, there is provided a pressure maintaining and alignment device, comprising:

a box body that is open at its front side to form an outer opening having a certain depth;

a cover assembly which is rotatably connected with the box body for opening and closing the outer opening;

a pushing assembly which is disposed on a rear side of the box body for selectively clamping a product to be pressure-maintained placed in the box body; and;

a pressing assembly, which is located at the rear side of the pushing assembly;

wherein the pressing assembly comprises a pushing rod and a pressing plate drivingly connected to the pushing rod, at least one pressing arm extending to above the box body is provided at the top of the pressing plate, an alignment adjusting assembly is provided between the pressing arm and the box body, and the pressing plate selectively pushes the alignment adjusting assembly by the pressing arm under the driving of the pushing rod, so that the product to be pressure-maintained in the box body is selectively pressed, pressure-maintained and aligned.

Preferably, the pushing assembly comprises:

a mounting plate which is provided at the back of the box body; and

L-shaped pushing rod, L-shaped connecting rod, and L-shaped clamping rod which are mounted on the mounting plate, wherein the pushing rod comprises a pushing portion perpendicular to a plane where the mounting plate is located and a driving portion in the plane where the mounting plate is located, the connecting rod is in the plane where the mounting plate is located, and the connecting rod is selectively rotatable around its corner.

Preferably, the clamping rod comprises a moving portion in the plane where the mounting plate is located and a clamping portion perpendicular to the plane where the mounting plate is located, the driving portion is perpendicular to the moving portion, and a horizontal portion and a vertical portion of the connecting rod are respectively hinged with the moving portion and the driving portion.

Preferably, the cover assembly comprises:

a connecting seat; and a cover body that is rotatably connected to the connecting seat, wherein a connecting portion rotatably connected to the connecting seat is fixed to a root portion of the cover body, and the connecting seat is disposed outside the pushing rod and fixed to the box body.

Preferably, a top pushing portion protruding outwardly is provided on a side of the connecting portion opposite to the pushing portion of the pushing rod, and the top pushing portion drives the pushing portion to selectively slide into the box body during the opening and closing of the cover body.

Preferably, a cavity for holding and protecting the product to be pressure-maintained is embedded in the box body, and the cavity is provided with an inner opening whose opening direction is consistent with that of the outer opening.

Preferably, the box body comprises:

a rear side plate; and a left support column, a right support column, and a bottom wall which are integrally connected to the rear side plate;

wherein the left support column, the right support column and the bottom wall are respectively disposed at the upper left corner, the lower right corner and the bottom of a front side of the rear side plate; the left support column and the right support column are at a certain distance from each other and are located on the left and right sides of the cavity; the right support column and the bottom wall are at a certain distance from each other and are located on the upper and lower sides of the connecting seat; and a relief space for allowing the pushing portion to enter and exit is provided on a side wall of the cavity corresponding to the pushing portion.

Preferably, the alignment adjusting assembly comprises:

an adjusting block located above the box body; and at least one clamping portion fixed to the adjusting block, wherein a camera and a clamping head directly below the camera are provided on the adjusting block opposite to the box body, and a relief through hole for allowing the clamping head to enter, exit and move is provided on the side wall of the cavity opposite to the clamping head, and the adjusting block is translatable in a horizontal plane and rotatable in a vertical plane with the clamping portion.

Preferably, the pressing arm comprises a left pressing arm and a right pressing arm, a transverse crossbeam is fixed to the top of the pressing plate, and the left pressing arm and the right pressing arm are respectively disposed at the left and right ends of the crossbeam, and a left spring pressing head and a right spring pressing head are respectively provided on the left pressing arm opposite to the alignment adjusting assembly and the right pressing arm opposite to the alignment adjusting assembly.

Preferably, a sliding wheel is provided on the pressing plate, and the pushing rod is in rolling connection with the sliding wheel, wherein a first guide slope with a certain slope and a second guide slope with a certain slope are provided on the pushing rod opposite to the sliding wheel, and a gentle transitional slope is further provided between the first guide slope and the second guide slope.

The present invention comprises at least the following beneficial effects compared to the prior art:

1. Since the pushing assembly can selectively clamp the product to be pressure-maintained placed in the box body and the pressing plate pushes the alignment adjusting assembly by the pressing arm under the driving of the pushing rod so that the product to be pressure-maintained is selectively pressure-maintained and aligned, the module to be assembled can be pressure-maintained and aligned after the product is integrally clamped, thereby improving assembly accuracy.

2. Since the top pushing portion protruding outwardly is provided on a side of the connecting portion opposite to the pushing portion of the pushing rod and the top pushing portion drives the pushing portion to selectively slide into the box body during the opening and closing of the cover body, the pushing portion drives the driving portion, the driving portion drives the connecting rod, the connecting rod drives the clamping rod to clamp the upper and lower sides of the product to be pressure-maintained, and the pushing portion clamps the left and right sides of the product to be pressure-maintained, the position of the product to be pressure-maintained inside the box body is fixed, providing alignment reference for the subsequent pressure maintaining and alignment.

3. Since the camera and the clamping head directly below the camera are provided on the adjusting block opposite to the box body, the clamping head can clamp the module to be assembled, and the camera can cooperate with the clamping head to clamp the module and accurately adjust the relative position between the module and the entirety of the product to be pressure-maintained.

DETAILED DESCRIPTION OF EMBODIMENTS

Figure 1:
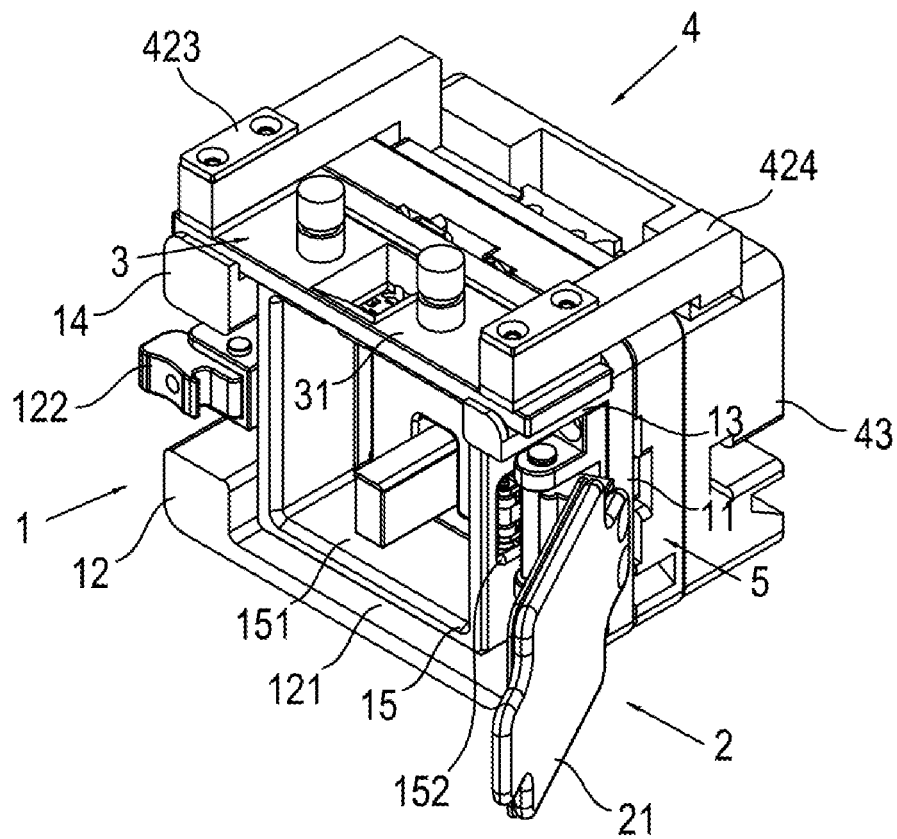
FIG. 1 is a three-dimensional structural view of the pressure maintaining and alignment device according to an embodiment of the present invention.

The present invention will be described in further detail with reference to the accompanying drawings below. The foregoing and other objects, features, aspects and advantages of the present invention will become more apparent, in order to enable person skilled in the art to practice with reference to the description. In the Figures, shapes and dimensions can be enlarged for clarity, and same or similar elements are indicated by same reference numerals throughout the Figures. In the description, relative terms such as front, rear, upper, lower, top, and bottom, etc. are based on the orientation or positional relationship shown in the drawings. These relative terms are for convenience of description and are generally not intended to require a particular orientation. Terms relating to attachment, coupling, etc. (e.g., "connected" and "attached") refer to a relationship in which these structures are directly or indirectly fixed or attached to each other through an intermediate structure, as well as a movable or rigid attachment or relationship, unless otherwise explicitly stated.

Figure 2:
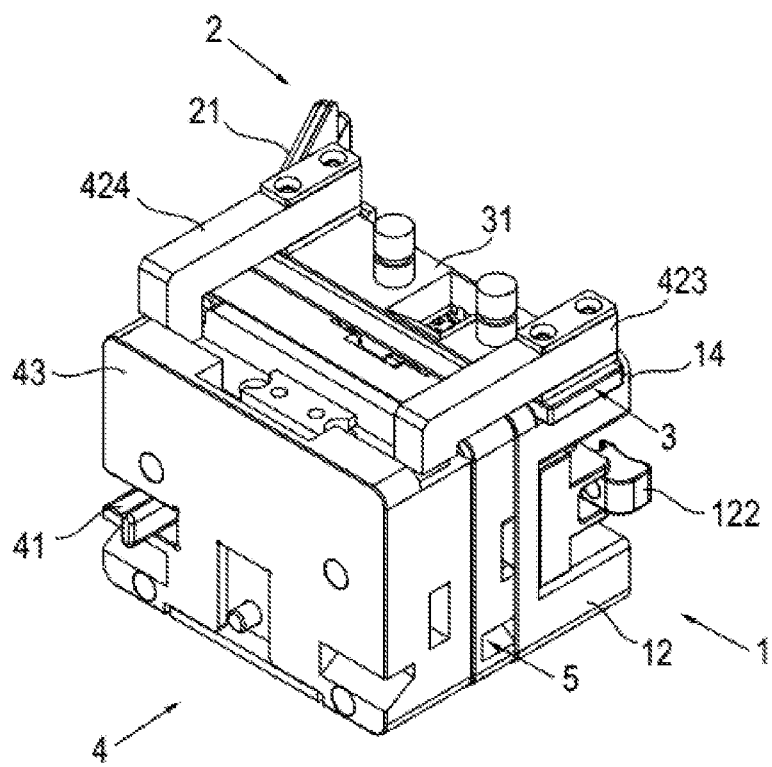
FIG. 2 is a three-dimensional structural view of the pressure maintaining and alignment device viewing from another angle according to an embodiment of the present invention.

As shown in FIG. 1 and FIG. 2, a pressure maintaining and alignment device, comprises:

a box body 1, a cover assembly 2, an alignment adjusting assembly 3, a pressing assembly 4, and a pushing assembly 5, wherein the box body 1 is open at its front side to form an outer opening 121 having a certain depth, the cover assembly 2 is rotatably connected with the box body 1 for opening and closing the outer opening 121, the pushing assembly 5 is disposed on the rear side of the box body 1 for selectively clamping a product to be pressure-maintained placed in the box body 1, and the pressing assembly 4 is located at the rear side of the pushing assembly 5. The pressing assembly 4 comprises a pushing rod 41 and a pressing plate 42 drivingly connected to the pushing rod 41, at least one pressing arm extending to above the box body 1 is provided at the top of the pressing plate 42, the alignment adjusting assembly 3 is provided between the pressing arm and the box body 1, and the pressing plate 42 selectively pushes the alignment adjusting assembly 3 by the pressing arm under the driving of the pushing rod 41, so that the product to be pressure-maintained in the box body 1 is selectively pressed, pressure-maintained and aligned. In a preferred embodiment, a protective cover 43 is further provided at the rear side of the pressing assembly 4 for protecting the pushing rod 41 and the pressing plate 42.

Figure 3:
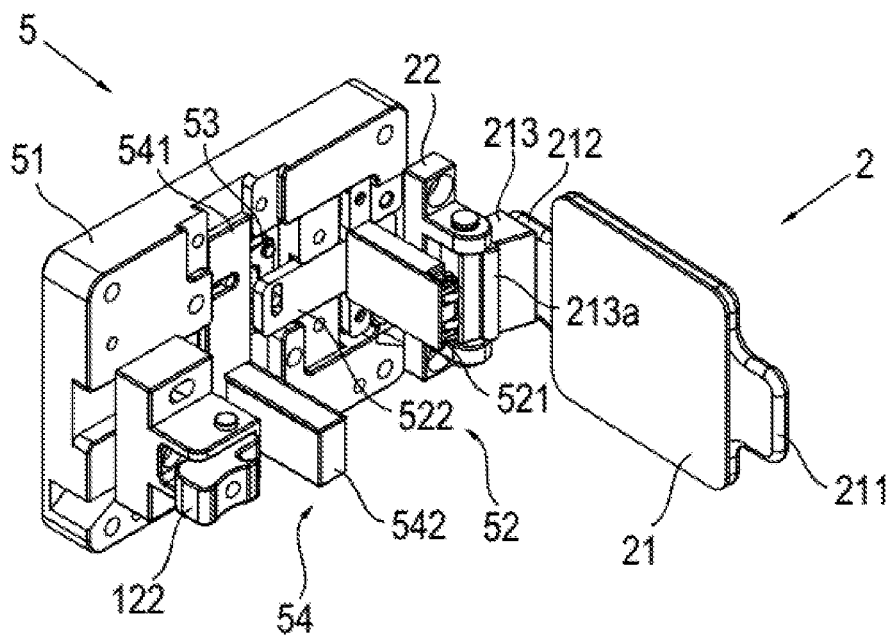
FIG. 3 is a three-dimensional structural view of the cooperation between the cover assembly and the pushing assembly in the pressure maintaining and alignment device according to an embodiment of the present invention.
Figure 4:
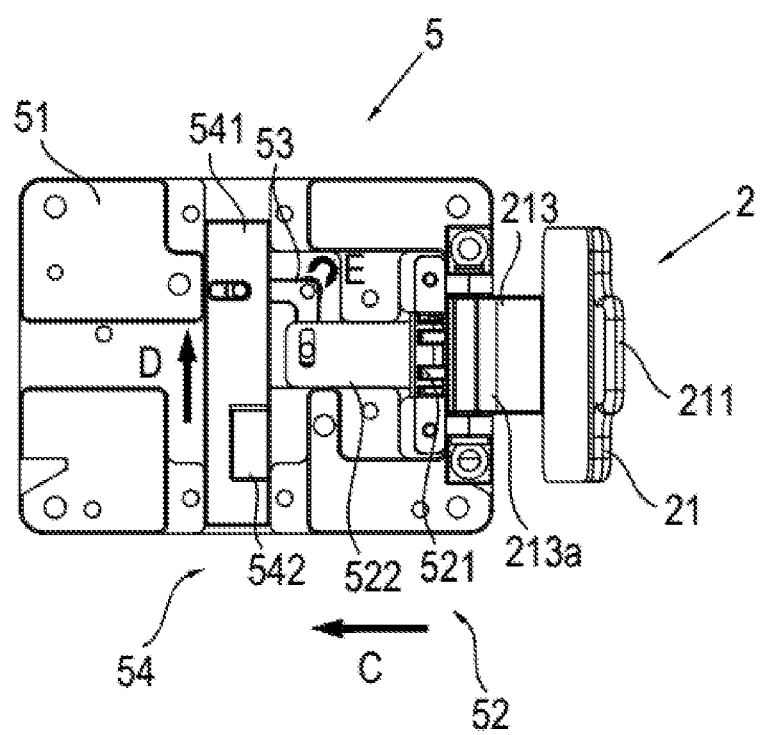
FIG. 4 is a front view of the cooperation between the cover assembly and the pushing assembly in the pressure maintaining and alignment device according to an embodiment of the present invention.

As shown in FIG. 3 and FIG. 4, the pushing assembly 5 comprises:

a mounting plate 51 which is provided at the back of the box body 1; and L-shaped pushing rod 52, L-shaped connecting rod 53, and L-shaped clamping rod 54 which are mounted on the mounting plate 51, wherein the pushing rod 52 comprises a pushing portion 521 perpendicular to a plane where the mounting plate 51 is located and a driving portion 522 in the plane where the mounting plate 51 is located, the connecting rod 53 is in the plane where the mounting plate 51 is located, and the connecting rod 53 is selectively rotatable around its corner.

Further, the clamping rod 54 comprises a moving portion 541 in the plane where the mounting plate 51 is located and a clamping portion 542 perpendicular to the plane where the mounting plate 51 is located, the driving portion 522 is perpendicular to the moving portion 541, and the horizontal portion and the vertical portion of the connecting rod 53 are respectively hinged with the moving portion 541 and the driving portion 522.

As shown in FIG. 3 and FIG. 4 again, the cover assembly 2 comprises:

a connecting seat 22; and a cover body 21 that is rotatably connected to the connecting seat 22, wherein a connecting portion 213 rotatably connected to the connecting seat 22 is fixed to a root portion 212 of the cover body 21, and the connecting seat 22 is disposed outside the pushing rod 52 and fixed to the box body 1.

Further, a top pushing portion 213*a* protruding outwardly is provided on a side of the connecting portion 213 opposite to the pushing portion 521 of the pushing rod 52, and the top pushing portion 213*a* drives the pushing portion 521 to selectively slide into the box body 1 during the opening and closing of the cover body 21. More particularly, after the pushing portion 521 of the pushing rod 52 receives the pushing force from the top pushing portion 213*a* on its right side, its driving portion 522 will move along the direction indicated by an arrow C and pass the pushing force to a lower end of the vertical portion of the connecting rod 53, so that the connecting rod 53 is rotatable around its corner along the direction indicated by an arrow E, and the horizontal portion of the connecting rod 53 drives the clamping rod 54 to move along the direction indicated by an arrow D during the rotation process. In this process, the pushing portion 521 of the pushing rod 52 gradually clamps the left and right sides of the product to be pressure-maintained, and the clamping portion 542 of the clamping rod 54 gradually clamps the upper and lower sides of the product to be pressure-maintained, so that the position of the product to be pressure-maintained inside the box body is fixed, providing a fixed reference of alignment for the subsequent pressure maintaining and alignment. In a preferred embodiment, a position opposite to a buckling end 211 of the cover body 21 is further provided with a buckle 122 for selectively locking the cover body 21 in a closed state.

As shown in FIG. 1, a cavity 15 for holding and protecting the product to be pressure-maintained is embedded in the box body 1, and the cavity 15 is provided with an inner opening 151 whose opening direction is consistent with that of the outer opening 121.

Further, the box body 1 comprises:

a rear side plate 11; and a left support column 14, a right support column 13, and a bottom wall 12 which are integrally connected to the rear side plate 11;

wherein the left support column 14, the right support column 13 and the bottom wall 12 are respectively disposed at the upper left corner, the lower right corner and the bottom of a front side of the rear side plate 11; the left support column 14 and the right support column 13 are at a certain distance from each other and are located on the left and right sides of the cavity 15; the right support column 13 and the bottom wall 12 are at a certain distance from each other and are located on the upper and lower sides of the connecting seat 22; and a relief space 152 for allowing the pushing portion 521 to enter and exit is provided on a side wall of the cavity 15 corresponding to the pushing portion 521. In an embodiment, the pushing portion 521 and the clamping portion 542 are sequentially passed through the rear side plate 11 of the box body 1 and the cavity 15 in the box body 1 and then located in the cavity 15. In a preferred embodiment, the inner side of a side wall of the cavity 15 and the inner side of the cover body 21 are covered with a layer of elastic buffer layer with thickness of 1 mm, which can effectively protect the surface quality of the product to be pressure-maintained.

Figure 5:
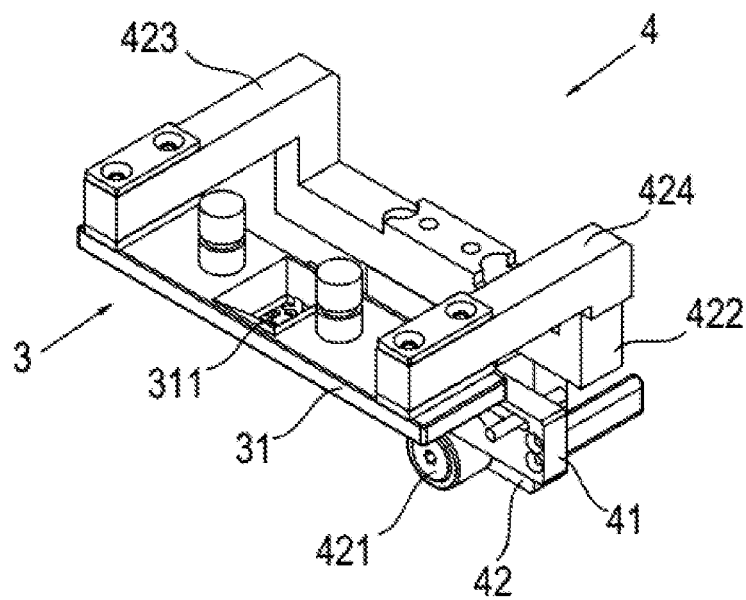
FIG. 5 is a three-dimensional structural view of the cooperation between the pressing assembly and the alignment adjusting assembly in the pressure maintaining and alignment device according to an embodiment of the present invention.
Figure 6:
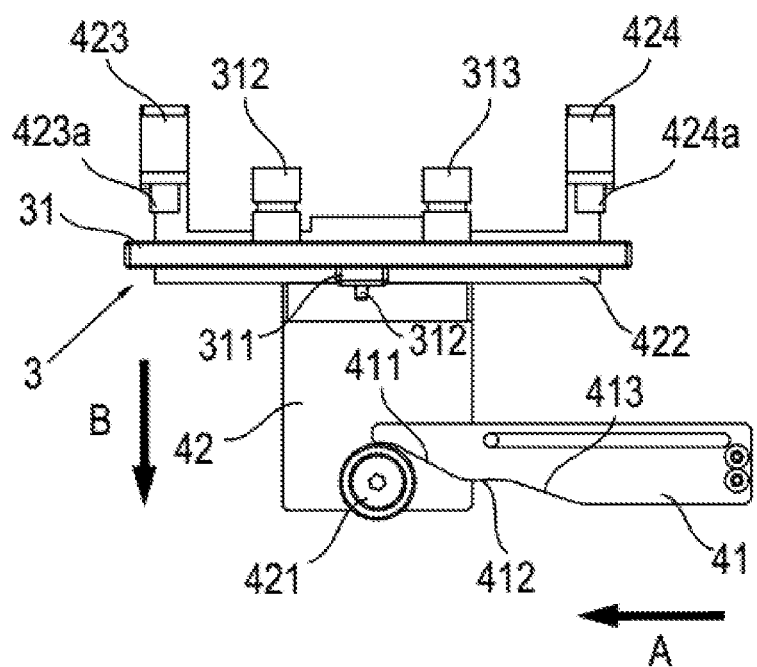
FIG. 6 is a front view of initial state of the cooperation between the pressing assembly and the alignment adjusting assembly in the pressure maintaining and alignment device according to an embodiment of the present invention.

As shown in FIG. 5 and FIG. 6, the alignment adjusting assembly 3 comprises:

an adjusting block 31 located above the box body 1; and at least one clamping portion fixed to the adjusting block 31, wherein a camera 331 and a clamping head 312 directly below the camera 331 are provided on the adjusting block 31 opposite to the box body 1, and a relief through hole for allowing the clamping head 312 to enter, exit and move is provided on the side wall of the cavity 15 opposite to the clamping head 312, and the adjusting block 31 is translatable in a horizontal plane and rotatable in a vertical plane with the clamping portion. The clamping head 312 can clamp a module to be assembled, and the camera 331 can cooperate with the clamping head 312 to clamp the module and accurately adjust the relative position between the module and the entirety of the product to be pressure-maintained. In a preferred embodiment, the clamping portion comprises a left clamping portion 312 and a right clamping portion 313. In a preferred embodiment, a left support spring and a right support spring are respectively supported between the adjusting block 31 and the left support column 14, and between the adjusting block 31 and the right support column 13. The left support spring and the right support spring can make the adjusting block 31 keep a balance of its own gravity and a spring force, and keep a certain distance between the adjusting block 31 and the box body 1 when the adjusting block 31 is not subjected to downforce.

Figure 7:
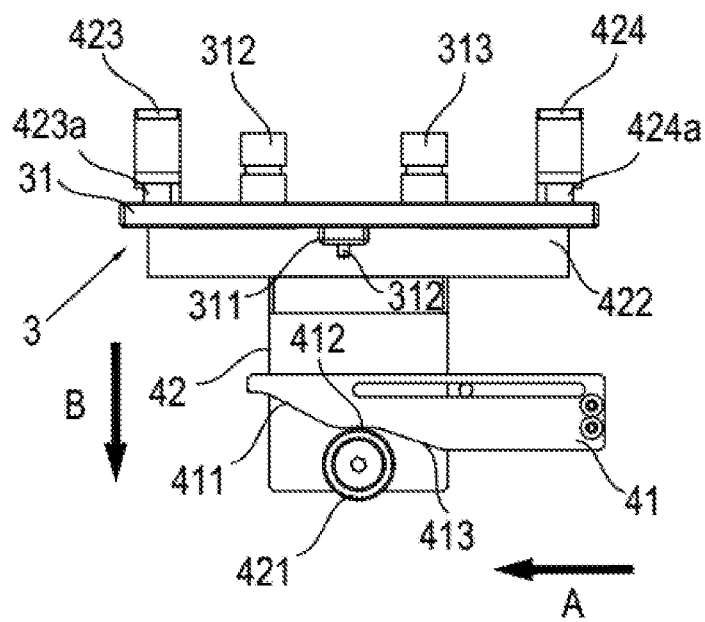
FIG. 7 is a front view of prepressing state of the cooperation between the pressing assembly and the alignment adjusting assembly in the pressure maintaining and alignment device according to an embodiment of the present invention.
Figure 8:
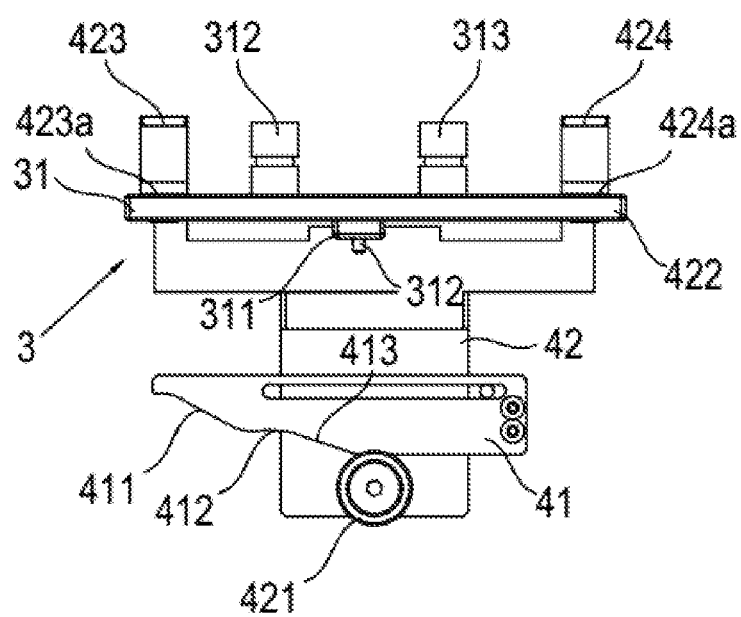
FIG. 8 is a front view of pressure-maintaining state of the cooperation between the pressing assembly and the alignment adjusting assembly in the pressure maintaining and alignment device according to an embodiment of the present invention.

As shown in FIG. 6, FIG. 7 and FIG. 8, the pressing arm comprises a left pressing arm 423 and a right pressing arm 424, a transverse crossbeam 422 is fixed to the top of the pressing plate 42, and the left pressing arm 423 and the right pressing arm 424 are respectively disposed at the left and right ends of the crossbeam 422, and a left spring pressing head 423*a* and a right spring pressing head 424*a* are respectively provided on the left pressing arm 423 opposite to the alignment adjusting assembly 3 and the right pressing arm 424 opposite to the alignment adjusting assembly 3.

Further, a sliding wheel 421 is provided on the pressing plate 42, and the pushing rod 41 is in rolling connection with the sliding wheel 421, wherein a first guide slope 411 with a certain slope and a second guide slope 413 with a certain slope are provided on the pushing rod 41 opposite to the sliding wheel 421, and a gentle transitional slope 412 is further provided between the first guide slope 411 and the second guide slope 413.

Operating principle:

1. First, placing the product to be pressure-maintained in the cavity 15 and putting on the cover body 21. During this process, the pushing portion 521 of the pushing rod 52 gradually clamps the left and right sides of the product to be pressure-maintained, and the clamping portion 542 of the clamping rod 54 gradually clamps the upper and lower sides of the product to be pressure-maintained, so that the position of the product to be pressure-maintained inside the box body 1 is fixed.

2. Secondly, the clamping head 312 of the adjusting block 31 clamps the module to be assembled, and the pushing rod 41 starts to push from outside to inside, so that the sliding wheel 421 pulls the pressing plate 42 downward under the guidance of the first guide slope 411, until the sliding wheel 421 is rolled to the transitional slope 412, at this time it is in a pre-pressing phase, as shown in FIG. 7. The left spring pressing head 423a and a right spring pressing head 424a press the adjusting block 31 while the camera 331 cooperates with the clamping head 312 to move in the horizontal plane and rotate in the vertical plane for adjustment and alignment. After the clamping head 312 adjusts the module to the predetermined position, the angle and the position are kept. The pushing rod 41 continues to be pushed inward, and the sliding wheel 421 continues to pull the pressing plate 42 downward under the guidance of the second guide slope 413, until the sliding wheel 421 is rolled to the horizontal surface end of the pushing rod 41, as the state shown in FIG. 8. The left spring pressing head 423a and the right spring pressing head 424a are contracted under force, until the pressing head and the adjusting block 31 are completely in contact with each other. The adjusting block is completely pressed, and the degree of freedom is 0. At this time it is in a pressure-maintaining phase.

The number of devices and processing scales described herein are intended to simplify the description of the present invention. Applicability, modifications, and variations of the present invention will be apparent to the person skilled in the art.

Although embodiments of the present invention have been disclosed as above, they are not limited to the implementations listed in the specification and embodiments. They can be applied to all kinds of fields suitable for the present invention. Additional modifications can be easily implemented to those who are familiar with the field. Therefore, the present invention is not limited to specific details and the legends shown and described herein without deviation from the general concepts defined in the claims and the equivalents thereof.

What is claimed is:

1. A pressure maintaining and alignment device, being characterized in that, it comprises:
    a box body (1) that is open at its front side to form an outer opening (121) having a certain depth;
    a cover assembly (2) which is rotatably connected with the box body (1) for opening and closing the outer opening (121);
    a pushing assembly (5) which is disposed on a rear side of the box body (1) for selectively clamping a product to be pressure-maintained placed in the box body (1); and
    a pressing assembly (4), which is located at the rear side of the pushing assembly (5);
    wherein the pressing assembly (4) comprises a pushing rod (41) and a pressing plate (42) drivingly connected to the pushing rod (41), at least one pressing arm extending to above the box body (1) is provided at a top of the pressing plate (42), an alignment adjusting assembly (3) is provided between the at least one pressing arm and the box body (1), and the pressing plate (42) selectively pushes the alignment adjusting assembly (3) by the at least one pressing arm under driving of the pushing rod (41), so that the product to be pressure-maintained in the box body (1) is selectively pressed, pressure-maintained and aligned.

2. The pressure maintaining and alignment device according to claim 1, being characterized in that, the pushing assembly (5) comprises:
    a mounting plate (51) which is provided at a back of the box body (1); and
    an L-shaped pushing rod (52), an L-shaped connecting rod (53), and an L-shaped clamping rod (54) which are mounted on the mounting plate (51);
    wherein the L-shaped pushing rod (52) comprises a pushing portion (521) perpendicular to a plane where the mounting plate (51) is located and a driving portion (522) in the plane where the mounting plate (51) is located, the L-shaped connecting rod (53) is in the plane where the mounting plate (51) is located, and the L-shaped connecting rod (53) is selectively rotatable around its corner.

3. The pressure maintaining and alignment device according to claim 2, being characterized in that, the L-shaped clamping rod (54) comprises a moving portion (541) in the plane where the mounting plate (51) is located and a clamping portion (542) perpendicular to the plane where the mounting plate (51) is located, the driving portion (522) is perpendicular to the moving portion (541), and a horizontal portion and a vertical portion of the L-shaped connecting rod (53) are respectively hinged with the moving portion (541) and the driving portion (522).

4. The pressure maintaining and alignment device according to claim 3, being characterized in that, the cover assembly (2) comprises:
    a connecting seat (22); and
    a cover body (21) that is rotatably connected to the connecting seat (22);
    wherein a connecting portion (213) rotatably connected to the connecting seat (22) is fixed to a root portion (212) of the cover body (21), and the connecting seat (22) is disposed outside the L-shaped pushing rod (52) and fixed to the box body (1).

5. The pressure maintaining and alignment device according to claim 4, being characterized in that, a top pushing portion (213a) protruding outwardly is provided on a side of the connecting portion (213) opposite to the pushing portion (521) of the L-shaped pushing rod (52), and the top pushing portion (213a) drives the pushing portion (521) to selectively slide into the box body (1) during the opening and closing of the cover body (21).

6. The pressure maintaining and alignment device according to claim 5, being characterized in that, a cavity (15) for holding and protecting the product to be pressure-maintained is embedded in the box body (1), and the cavity (15) is provided with an inner opening (151) whose opening direction is consistent with that of the outer opening (121).

7. The pressure maintaining and alignment device according to claim 6, being characterized in that, the box body (1) comprises:
    a rear side plate (11); and
    a left support column (14), a right support column (13), and a bottom wall (12) which are integrally connected to the rear side plate (11);
    wherein the left support column (14), the right support column (13) and the bottom wall (12) are respectively disposed at an upper left corner, a lower right corner and a bottom of a front side of the rear side plate (11); the left support column (14) and the right support column (13) are at a certain distance from each other and are located on left and right sides of the cavity (15); the right support column (13) and the bottom wall (12) are at a certain distance from each other and are located on upper and lower sides of the connecting seat (22); and a relief space (152) for allowing the pushing portion (521) to enter and exit is provided on a side wall of the cavity (15) corresponding to the pushing portion (521).

8. The pressure maintaining and alignment device according to claim 7, being characterized in that, the alignment adjusting assembly (3) comprises:
- an adjusting block (31) located above the box body (1); and
- at least one clamping portion fixed to the adjusting block (31),
- wherein a camera (331) and a clamping head (312) directly below the camera (331) are provided on the adjusting block (31) opposite to the box body (1), and a relief through hole for allowing the clamping head (312) to enter, exit and move is provided on the side wall of the cavity (15) opposite to the clamping head (312), and the adjusting block (31) is translatable in a horizontal plane and rotatable in a vertical plane with the at least one clamping portion fixed to the adjusting block (31).

9. The pressure maintaining and alignment device according to claim 1, being characterized in that, the at least one pressing arm comprises a left pressing arm (423) and a right pressing arm (424), a transverse crossbeam (422) is fixed to the top of the pressing plate (42), and the left pressing arm (423) and the right pressing arm (424) are respectively disposed at left and right ends of the crossbeam (422), and a left spring pressing head (423*a*) and a right spring pressing head (424*a*) are respectively provided on the left pressing arm (423) opposite to the alignment adjusting assembly (3) and the right pressing arm (424) opposite to the alignment adjusting assembly (3).

10. The pressure maintaining and alignment device according to claim 1, being characterized in that, a sliding wheel (421) is provided on the pressing plate (42), and the pushing rod (41) is in rolling connection with the sliding wheel (421), wherein a first guide slope (411) with a certain slope and a second guide slope (413) with a certain slope are provided on the pushing rod (41) opposite to the sliding wheel (421), and a gentle transitional slope (412) is further provided between the first guide slope (411) and the second guide slope (413).

\* \* \* \* \*